(12) United States Patent
Witthawaskul et al.

(10) Patent No.: US 10,754,713 B1
(45) Date of Patent: Aug. 25, 2020

(54) SYSTEMS AND METHODS FOR MANAGING SOFTWARE EVENTS

(71) Applicant: Facebook, Inc., Menlo Park, CA (US)

(72) Inventors: Weerasak Witthawaskul, Mountain View, CA (US); Lukas Camra, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 2 days.

(21) Appl. No.: 16/176,227

(22) Filed: Oct. 31, 2018

(51) Int. Cl.
*G06F 9/54* (2006.01)

(52) U.S. Cl.
CPC .................................. *G06F 9/542* (2013.01)

(58) Field of Classification Search
None
See application file for complete search history.

(56) References Cited

U.S. PATENT DOCUMENTS

| 2013/0041998 | A1* | 2/2013 | Kordasiewicz |
| 2014/0304724 | A1* | 6/2014 | Shin |
| 2017/0171252 | A1* | 6/2017 | Xue |

\* cited by examiner

*Primary Examiner* — Syed A Roni
(74) *Attorney, Agent, or Firm* — Sheppard Mullin Richter & Hampton LLP (57) ABSTRACT

Systems, methods, and non-transitory computer-readable media can determine at least one event generated by a content player while accessing a content item. Event information describing the at least one event can be provided to a finite-state machine being used to manage events generated by the content player. The finite-state machine is in a first state. The finite-state machine can be transitioned from the first state to a second state in response to provision of the event information. One or more actions associated with the second state can be performed based at least in part on transitioning the finite-state machine to the second state.

20 Claims, 7 Drawing Sheets

SYSTEMS AND METHODS FOR MANAGING SOFTWARE EVENTS

FIELD OF THE INVENTION

The present technology relates to the field of content processing. More particularly, the present technology relates to techniques for managing software events.

BACKGROUND

Under conventional approaches, software programs (or applications) can generate various events. For example, a software program may generate events that can be used to diagnose or troubleshoot errors. In another example, a software program may generate events that describe operations performed by a given user. For example, a software-based content player (e.g., video player) may generate events when a user interacts with the content player to access content.

SUMMARY

Various embodiments of the present technology can include systems, methods, and non-transitory computer readable media configured to determine at least one event generated by a content player while accessing a content item. Event information describing the at least one event can be provided to a finite-state machine being used to manage events generated by the content player. The finite-state machine is in a first state. The finite-state machine can be transitioned from the first state to a second state in response to provision of the event information. One or more actions associated with the second state can be performed based at least in part on transitioning the finite-state machine to the second state.

In an embodiment, the one or more actions cause the event information describing the at least one event to be logged.

In an embodiment, the event information describes the content item being accessed, a timestamp indicating when the content item was accessed, and the at least one event that was generated.

In an embodiment, the logged event information is used to determine one or more view metrics for the content item.

In an embodiment, the set of states include at least a play state, a paused state, an unpaused state, and an exit state.

In an embodiment, the at least one event is generated in response to one or more actions performed by a user interacting with the content player.

In an embodiment, the first state is associated with one or more conditions that are satisfied upon provision of the event information, and wherein satisfaction of the one or more conditions causes the finite-state machine to be transitioned to the second state.

In an embodiment, the systems, methods, and non-transitory compute readable media are configured to determine a different event generated by the content player while accessing the content item; provide event information describing the different event to the finite-state machine; transition the finite-state machine from the second state to a third state in response to provision of the event information describing the different event; and cause one or more actions associated with the third state to be performed based at least in part on transitioning the finite-state machine to the third state.

In an embodiment, the one or more actions associated with the third state cause the event information describing the different event to be logged.

In an embodiment, the event describes a playback status of the content item.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Managing Software Generated Events

Under conventional approaches, software programs can generate various events. For example, a software program may generate events that can be used to diagnose or troubleshoot errors. In another example, a software program may generate events that describe user operations. For example, a software-based content player (e.g., video player) may generate events when a user interacts with the content player to access content. In this example, the content player may generate events indicating when the user selected an option to play a given content item content, an option to pause playback of the content item, an option to resume (or unpause) presentation of the content item, and an option to stop playback of the content item, to name some examples. In some instances, such events can be used to determine metrics for content items such as view count, watch time, and average view duration, to name some examples. However, conventional approaches for generating software-based events have a number of drawbacks. For instance, conventional approaches typically involve such events being generated and logged by the same software programs. In such instances, bugs in software programs can prevent accurate logging of events. For example, bugs in a software program may result in events not being generated or logged. In another example, bugs in a software program may result in duplicate events being generated or logged. Such inaccuracies often propagate downstream and can result in inaccurate metrics being determined for content items. These inaccuracies can result in suboptimal ranking and presentation of content items to users.

An improved approach rooted in computer technology overcomes the foregoing and other disadvantages associated with conventional approaches specifically arising in the realm of computer technology. In various embodiments, events for content items can be logged using finite-state machines. For example, a finite-state machine can include a number of states that each correspond to some playback event (e.g., a play state, a paused state, a stop state, etc.). These states can be used to manage events that are generated while accessing a given content item. For example, the finite-state machine can begin in an initial state. The finite-state machine can then transition to other states based on events generated for the content item. For example, the finite-state machine can transition from the initial state to a play state in response to detecting a play operation to view the content item. Some states of the finite-state machine may be associated with one or more respective actions that are performed when the finite-state machine is transitioned to those states. In some embodiments, such actions can include logging event information describing events that were generated for the content item. For example, the play state may be associated with an action that causes event information describing the play operation to be logged. In this example, upon transitioning the finite-state machine to the play state, event information describing the play operation can be logged. The finite-state machine offers a number of advantages over conventional approaches. For example, the finite-state machine helps ensure that events are logged in a proper sequence and include correct information (or payloads) (e.g., a timestamp indicating when the content item was played, a timestamp indicating when presentation of the content item was paused, etc.). The finite-state machine also helps prevent duplicative and erroneously generated events from being logged. For example, once the finite-state machine is in the play state, a duplicative event generated in response to the play operation can be discarded since the finite-state machine is already in the play state. As a result, actions associated with the play state (e.g., logging event information) are not performed again in response to the duplicative event since such actions are only performed when transitioning to the play state. Thus, the finite-state machine helps ensure accurate logging of software-generated events, thereby improving the accuracy of corresponding metrics relating to interactions with and popularity of content items. Such metrics can be used to prioritize and provide content items to users of a social networking system. For example, accurate view counts for videos can be used to rank the videos based on popularity. In another example, accurate watch times for videos accessed by a user can be used to determine content categories (e.g., content from certain publishers, content relating to certain topics, etc.) that are of interest to the user. More details relating to the present technology are provided below.

Figure 1:
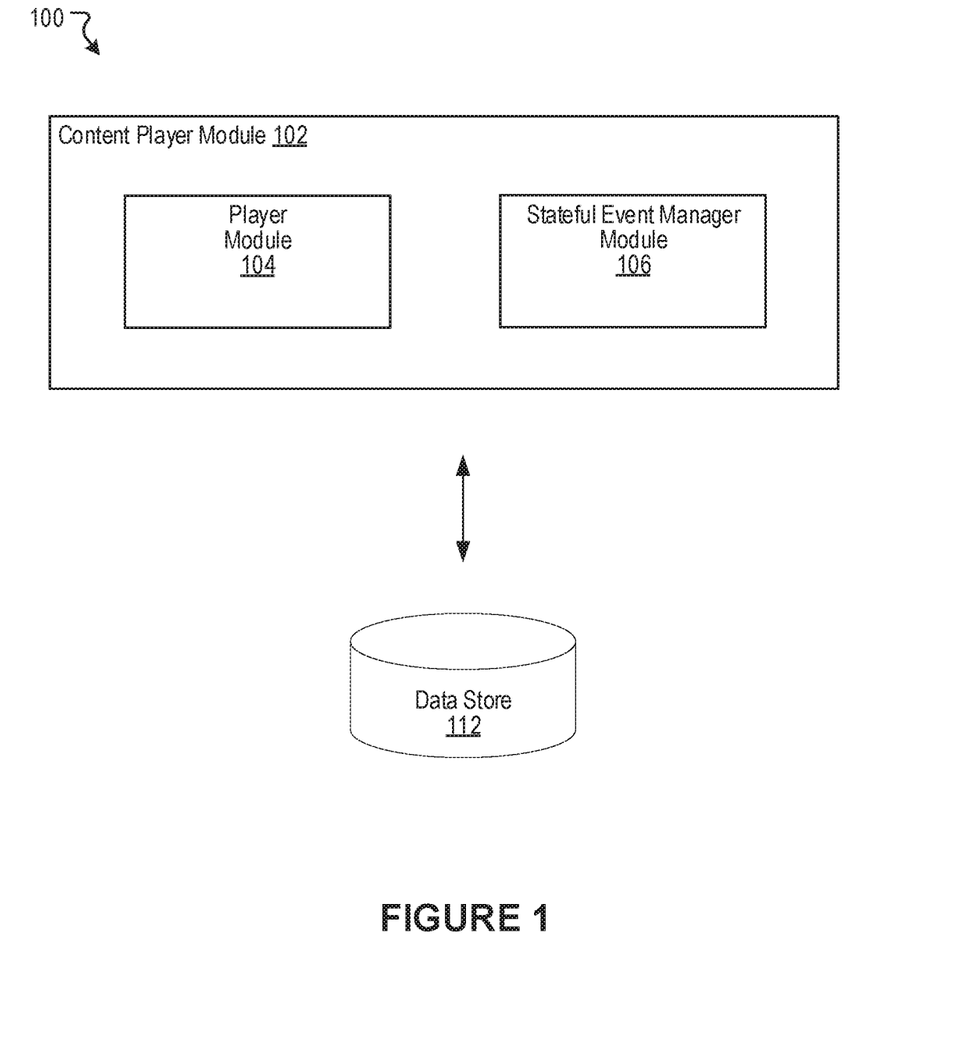
FIG. 1 illustrates an example system including an example content player module, according to an embodiment of the present technology.

FIG. 1 illustrates an example system 100 including an example content player module 102, according to an embodiment of the present technology. As shown in the example of FIG. 1, the content player module 102 can include a player module 104 and a stateful event manager module 106. In some instances, the example system 100 can include at least one data store 112. The components (e.g., modules, elements, etc.) shown in this figure and all figures herein are exemplary only, and other implementations may include additional, fewer, integrated, or different components. Some components may not be shown so as not to obscure relevant details.

In some embodiments, the content player module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content player module 102 or at least a portion thereof can be implemented using one or more computing devices or systems that include one or more servers, such as network servers or cloud servers. In some instances, the content player module 102 can, in part or in whole, be implemented within or configured to operate in conjunction with a social networking system (or service), such as the social networking system 630 of FIG. 6. In some instances, the content player module 102 can be, in part or in whole, implemented within or configured to operate in conjunction or be integrated with a client computing device, such as the user device 610 of FIG. 6. For example, the content player module 102 can be implemented as or within a dedicated application (e.g., app), a program, or an applet running on a user computing device or client computing system. The application incorporating or implementing instructions for performing some, or all, functionality of the content player module 102 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

The content player module 102 can be configured to communicate and/or operate with the at least one data store 112, as shown in the example system 100. The at least one data store 112 can be configured to store and maintain various types of data. For example, the data store 112 can store information describing various content that has been shared by users of a social networking system. In some embodiments, the data store 112 can store event information corresponding to content items which was logged using finite-state machines. In some implementations, the at least one data store 112 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 112 can store information associated with users, such as user identifiers, user information, profile information, user specified settings, content produced or posted by users, and various other types of user data.

In various embodiments, the player module 104 can be configured to provide an interface for accessing (or streaming) content items (e.g., videos, audio, virtual reality content, etc.). For example, the player module 104 can stream content items from a content server (e.g., a social networking system) over one or more computer networks. The interface can include generally known options for accessing content items including, for example, a play option, a stop option, a pause option, a resume (or unpause) option, one or more seek options, and a skip option. In various embodiments, the player module 104 can generate events when accessing content items. For example, the player module 104 can generate an event when a user selects an option to play a content item. Similarly, the player module 104 can generate additional events when the user selects options to stop presentation of the content item, pause presentation of the content item, resume (or unpause) presentation of the content item, seek a different position in the content item, or skip presentation of the content item, to name some examples. The player module 104 may also generate events for errors encountered by the player module 104 when accessing content items. For example, the player module 104 can generate such events when a content item cannot be accessed or when playback of the content item fails. Naturally, many variations are possible with respect to the types of events that may be generated by the player module 104.

The stateful event manager module 106 can be configured to manage events that are generated by the player module 104. For example, the stateful event manager module 106 can determine events generated by the player module 104 when accessing a given content item. In various embodiments, the stateful event manager module 106 can log such events using one or more finite-state machines. More details regarding the stateful event manager module 106 will be provided below with reference to FIG. 2.

Figure 2:
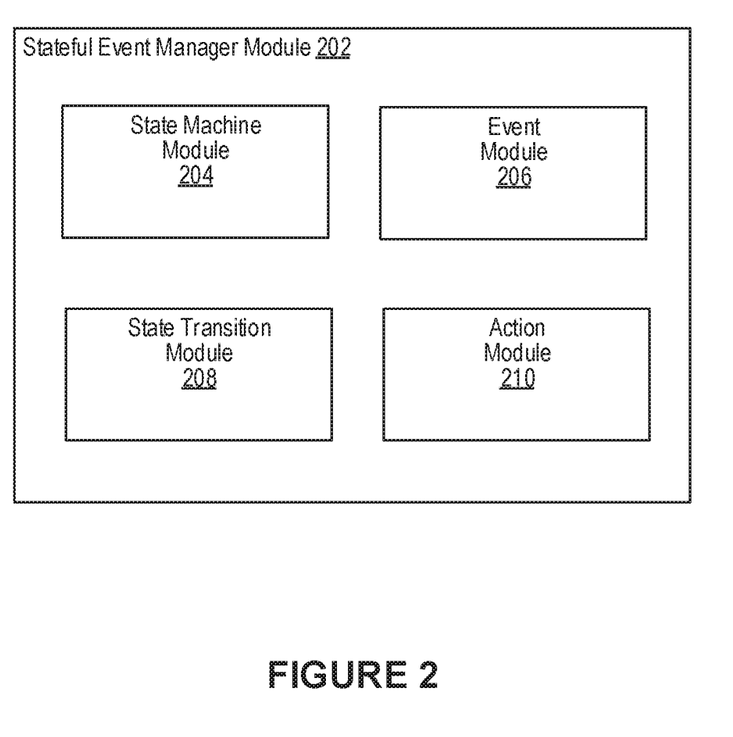
FIG. 2 illustrates an example stateful event manager module, according to an embodiment of the present technology.

FIG. 2 illustrates a stateful event manager module 202, according to an embodiment of the present technology. The stateful event manager module 202 can manage events generated by a content player application (e.g., the player module 104 of FIG. 1). In some embodiments, the stateful event manager module 106 of FIG. 1 can be implemented with the stateful event manager module 202. As shown in the example of FIG. 2, the stateful event manager module 202 can include a state machine module 204, an event module 206, a state transition module 208, and an action module 210.

The state machine module 204 can initialize finite-state machines that can be used to manage events generated by a content player (e.g., the player module 104 of FIG. 1) when accessing content items. In general, a finite-state machine can be associated with a number of states. Further, the finite-state machine can be in one state at any given time. For example, once initialized, the finite-state machine can begin in an initial state. The finite-state machine can then transition from its initial state to other associated states, for example, based on inputs provided to the finite-state machine. For example, each state of the finite-state machine can be associated with respective conditions which, when satisfied, cause the finite-state machine to transition from that state to some other state. For example, the initial state of the finite-state machine may be associated with a first set of conditions for transitioning to a first state and a second set of conditions for transitioning to a second state. In this example, when input provided to the finite-state machine satisfies the first set of conditions, the finite-state machine can transition to the first state. Alternatively, when input provided to the finite-state machine satisfies the second set of conditions, the finite-state machine can transition to the second state. In some embodiments, some, or all, states of the finite-state machine can be associated with respective actions that are performed when the finite-state machine is transitioned to those states. In the foregoing example, one or more actions associated with the first state can be performed when the finite-state machine is transitioned from the initial state to the first state. Similarly, one or more actions associated with the second state may be performed when the finite-state machine is transitioned from the initial state to the second state. In some embodiments, these actions include logging events generated by the content player. For example, the finite-state machine may be associated with an initial state, a play state, a stop state, a pause state, and an exit state. In this example, event information describing an event generated by the content player can be provided as input to the finite-state machine. The input may cause the finite-state machine to transition from the initial state to the play state. The play state may be associated with one or more actions that are performed in response to the finite-state machine being transitioned to the play state. For example, the play state may be associated with an action that causes the event information to be logged. Naturally, many variations are possible with respect to the types of states that may be associated with finite-state machines.

The event module 206 can determine and provide event information as input to finite-state machines. In various embodiments, a content player (e.g., the player module 104 of FIG. 1) can generate events while accessing a content item. The content player can generate software-based events in response to operations performed by a user or by a computing system (or device) on which the content player is running. For example, the content player can generate a play event when the content item is played using the content player. In another example, the content player can generate a stop event when presentation of the content item is stopped. In another example, the content player can generate a pause event when presentation of the content item is paused. In yet another example, the content player can generate a resume (or unpause) event when presentation of the content item is resumed. Many variations are possible with respect to the types of events that may be generated. For example, upon initialization, a finite-state machine being used to manage events associated with a content item can begin in an initial state. In this example, a content player being used to access the content item can generate a play event when the content item is played. The event module 206 can detect the play event and can provide event information describing the play event to the finite-state machine as input. The state transition module 208 can evaluate the inputted event information to determine whether to transition the finite-state machine from its initial state to a different state, as described below. In some embodiments, a separate finite-state machine is used to manage events for each content item that is accessed using the content player.

The state transition module 208 can evaluate event information that is provided as input to finite-state machines. Such event information may be provided as input by the event module 206, as described above. In some embodiments, when event information is inputted to a finite-state machine, the state transition module 208 can evaluate the event information to determine whether the finite-state machine can transition from its current state to a different state. For example, the current state of the finite-state machine may be associated with one or more conditions which, when satisfied, permit transition from the current state to the different state. In this example, the state transition module 208 can evaluate the event information to determine whether the one or more conditions associated with the current state are satisfied. If satisfied, the state transition module 208 can transition the finite-state machine from the current state to the different state. For example, the state transition module 208 can update the current state associated with the finite-state machine to correspond to the different state. If the conditions are not satisfied, then the finite-state machine remains in its existing state.

The action module 210 can be configured to perform any actions that are associated with a state in response to a finite-state machine being transitioned to that state. For example, a finite-state machine may include at least a play state. The play state may be associated with one or more actions that are performed in response to the finite-state machine being transitioned to the play state. For example, event information provided to the finite-state machine may cause the finite-state machine to be transitioned to the play state. In various embodiments, in response to transitioning to the play state, the action module 210 can perform the one or more actions that are associated with the play state. In some embodiments, the one or more actions can include logging the inputted event information that caused the finite-state machine to transition to the play state. In some embodiments, the logged event information can identify the accessed content item, a timestamp indicating when the content item was accessed, and the type of event that was generated, to name some examples.

Figure 3:
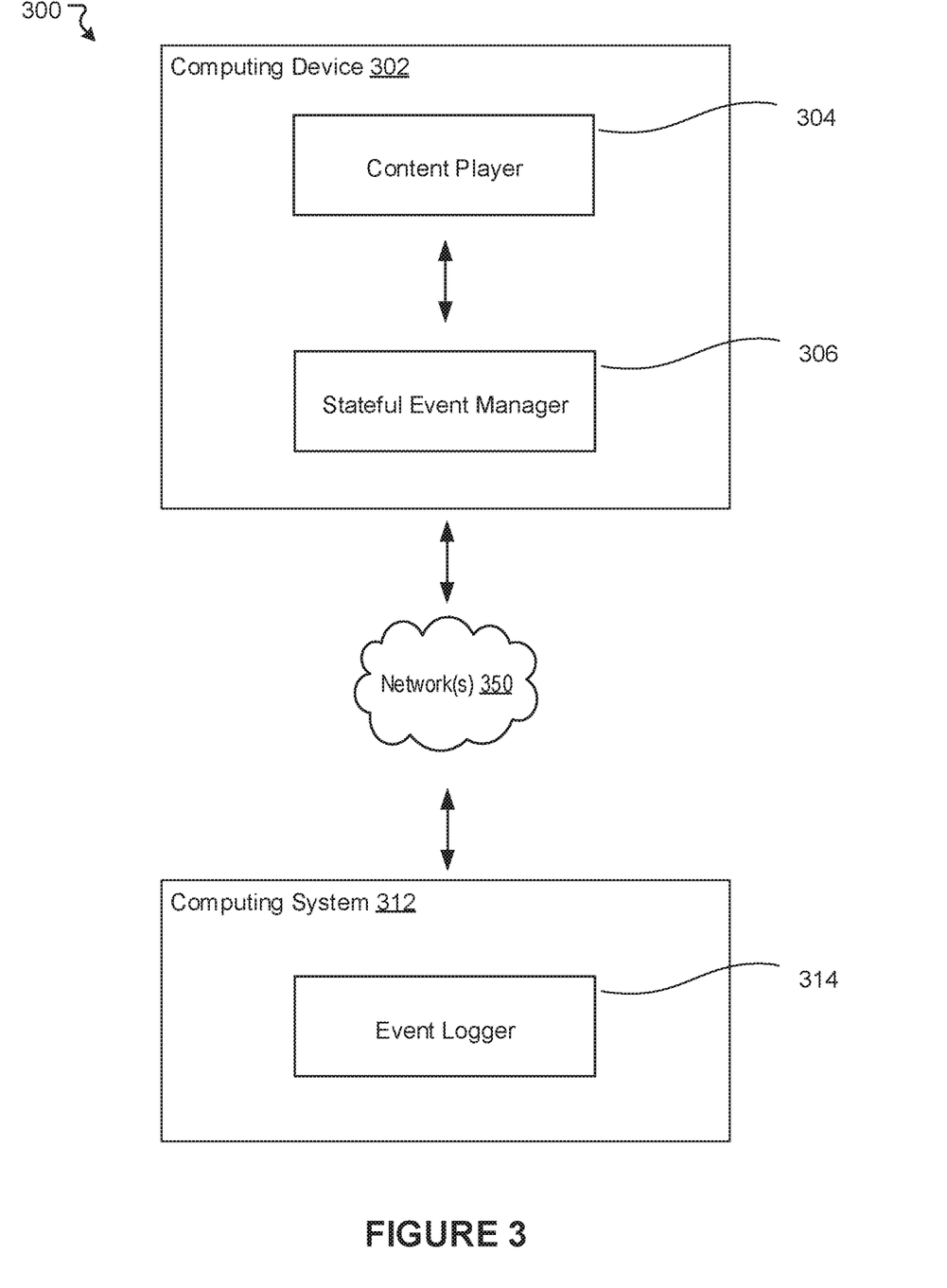
FIG. 3 illustrates an example diagram, according to an embodiment of the present technology.

FIG. 3 illustrates an example diagram of an example system 300. The diagram illustrates a computing device 302 that implements a content player 304 (e.g., the player module 104 of FIG. 1) and a stateful event manager 306 (e.g., the stateful event manager module 106 of FIG. 1). In various embodiments, the content player 304 can be used to access (or stream) content items. When a content item is accessed, the stateful event manager 306 can implement a corresponding finite-state machine that can be used to manage events generated by the content player 304 while accessing the content item. For example, the stateful event manager 306 can log event information describing events that are generated by the content player 304 while accessing the content item. As mentioned, such event information can be logged as the finite-state machine for the content item transitions from one state to another. In some embodiments, event information logged at the computing device 302 can be shared with a computing system 312 over one or more computer networks 350. For example, an event logger 314 implemented by the computing system 312 can be configured to store event information that was logged at the computing device 302. In various embodiments, such event information can be used to generate respective metrics (e.g., view count, watch time, average view duration, etc.) for content items. Such metrics may be used to rank and present the content items to users of a social networking system, for example.

Figure 4:
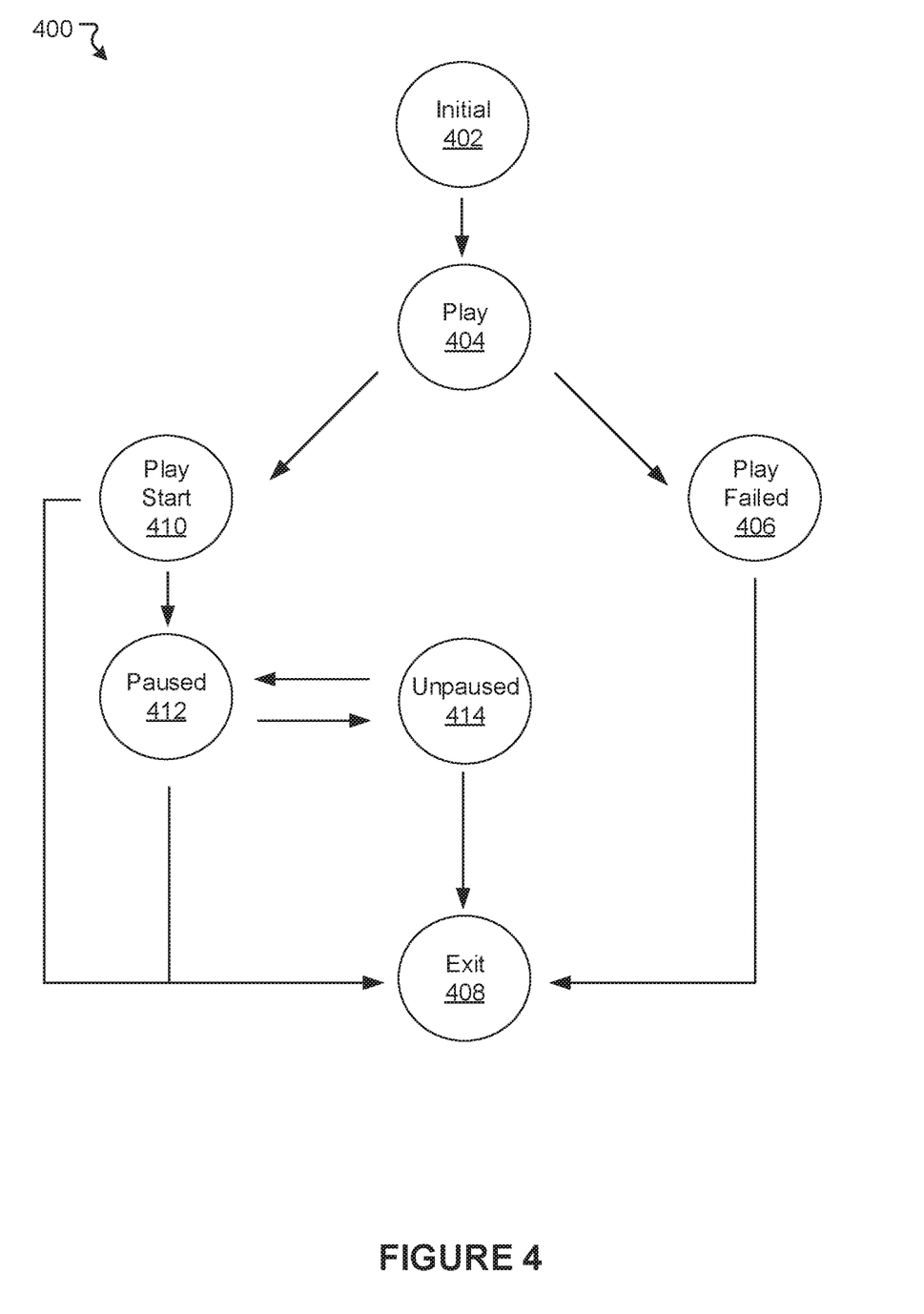
FIG. 4 illustrates another example diagram, according to an embodiment of the present technology.

FIG. 4 illustrates an example diagram of a finite-state machine 400. The finite-state machine 400 includes an initial state 402, a play state 404, a play failed state 406, an exit state 408, a play start state 410, a paused state 412, and an unpaused state 414. In the example of FIG. 4, the finite-state machine 400 can manage events generated by a content player (e.g., the player module 104 of FIG. 1) while accessing a content item. For example, the finite-state machine 400 can begin in the initial state 402. When a play operation is performed, the content player can generate a play event. In this example, the finite-state machine 400 can transition from the initial state 402 to the play state 404 in response to the play event. In some embodiments, any actions associated with the play state 404 can be performed when the finite-state machine 400 is transitioned to the play state 404. For example, an action associated with the play state 404 can cause event information describing the play event to be logged. While in the play state 404, if the content player generates a play failure event, the finite-state machine 400 can transition to the play failed state 406. In some embodiments, any actions associated with the play failed state 406 (e.g., event logging) can be performed when the finite-state machine is transitioned to the play failed state 406. The finite-state machine 400 can then be transitioned to the exit state 408 in response to the content player generating an exit event. Alternatively, while in the play state 404, if the content player generates a play start event, the finite-state machine 400 can transition to the play start state 410. In some embodiments, any actions associated with the play start state 410 (e.g., event logging) can be performed when the finite-state machine is transitioned to the play start state 410. If the content player generates a duplicate play start event while the finite-state machine 400 is already in the play start state 410, the finite-state machine 400 can remain in the play start state 410 since no valid state transitions exist. While in the play start state 410, if the content player generates a pause event, the finite-state machine 400 can transition to the paused state 412. In some embodiments, any actions associated with the paused state 412 (e.g., event logging) can be performed when the finite-state machine is transitioned to the paused state 412. While in the paused state 412, if the content player generates an unpaused event, the finite-state machine 400 can transition to the unpaused state 414. In some embodiments, any actions associated with the unpaused state 414 (e.g., event logging) can be performed when the finite-state machine is transitioned to the unpaused state 414. While in the unpaused state 414, if the content player generates a paused event, the finite-state machine 400 can transition to the paused state 412. In some embodiments, any actions associated with the paused state 412 (e.g., event logging) can be performed when the finite-state machine is transitioned to the paused state 412. The finite-state machine 400 can transition from the paused state 412 or the unpaused state 414 to the exit state 408 when the content player generates an exit event. Many variations are possible.

Figure 5:
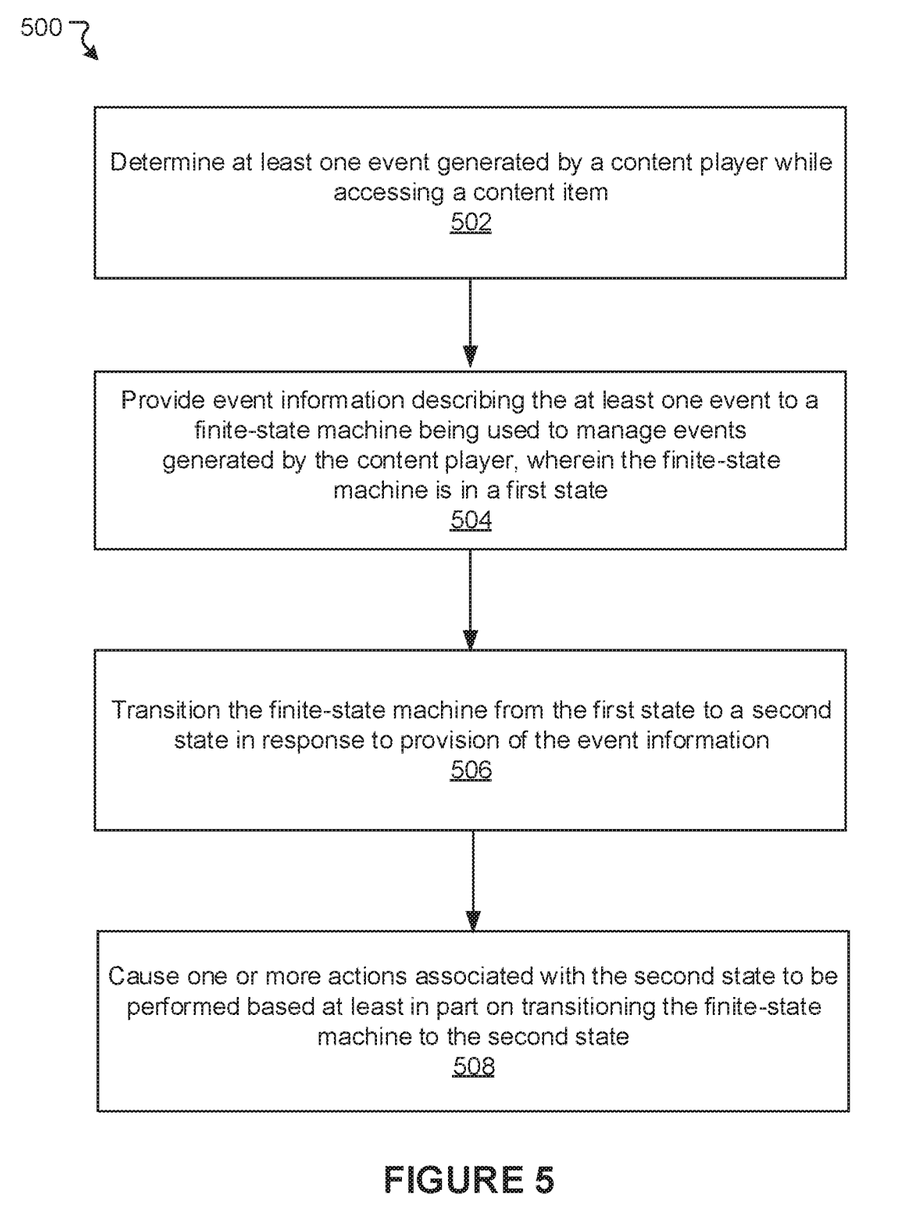
FIG. 5 illustrates an example method, according to an embodiment of the present technology.

FIG. 5 illustrates an example method 500, according to an embodiment of the present technology. It should be appreciated that there can be additional, fewer, or alternative steps performed in similar or alternative orders, or in parallel, within the scope of the various embodiments discussed herein unless otherwise stated.

At block 502, at least one event generated by a content player while accessing a content item can be determined. At block 504, event information describing the at least one event can be provided to a finite-state machine being used to manage events generated by the content player. The finite-state machine is in a first state. At block 506, the finite-state machine can be transitioned from the first state to a second state in response to provision of the event information. At block 508, one or more actions associated with the second state can be performed based at least in part on transitioning the finite-state machine to the second state.

It is contemplated that there can be many other uses, applications, and/or variations associated with the various embodiments of the present technology. For example, in some cases, user can choose whether or not to opt-in to utilize the disclosed technology. The disclosed technology can also ensure that various privacy settings and preferences are maintained and can prevent private information from being divulged. In another example, various embodiments of the present technology can learn, improve, and/or be refined over time.

Social Networking System—Example Implementation

Figure 6:
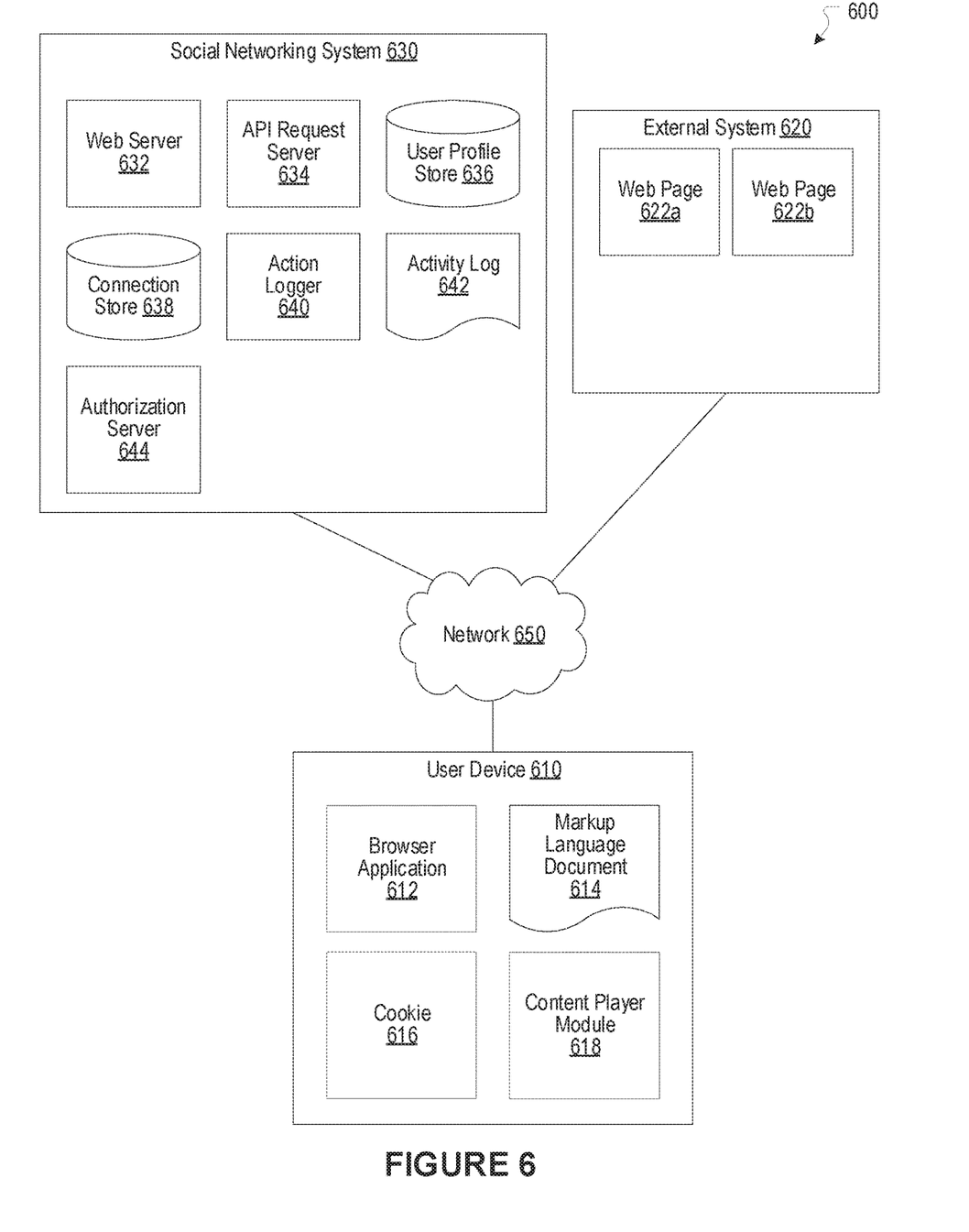
FIG. 6 illustrates a network diagram of an example system including an example social networking system that can be utilized in various scenarios, according to an embodiment of the present technology.

FIG. 6 illustrates a network diagram of an example system 600 that can be utilized in various scenarios, in accordance with an embodiment of the present technology. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610. The user device 610 can include a content player module 618. In some embodiments, the content player module 618 can be implemented as the content player module 102 of FIG. 1.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content player module. The content player module, for example, can be implemented as some or all of the functionality of the content player module 102 of FIG. 1. As discussed previously, it should be appreciated that there can be many variations or other possibilities.

Hardware Implementation

Figure 7:
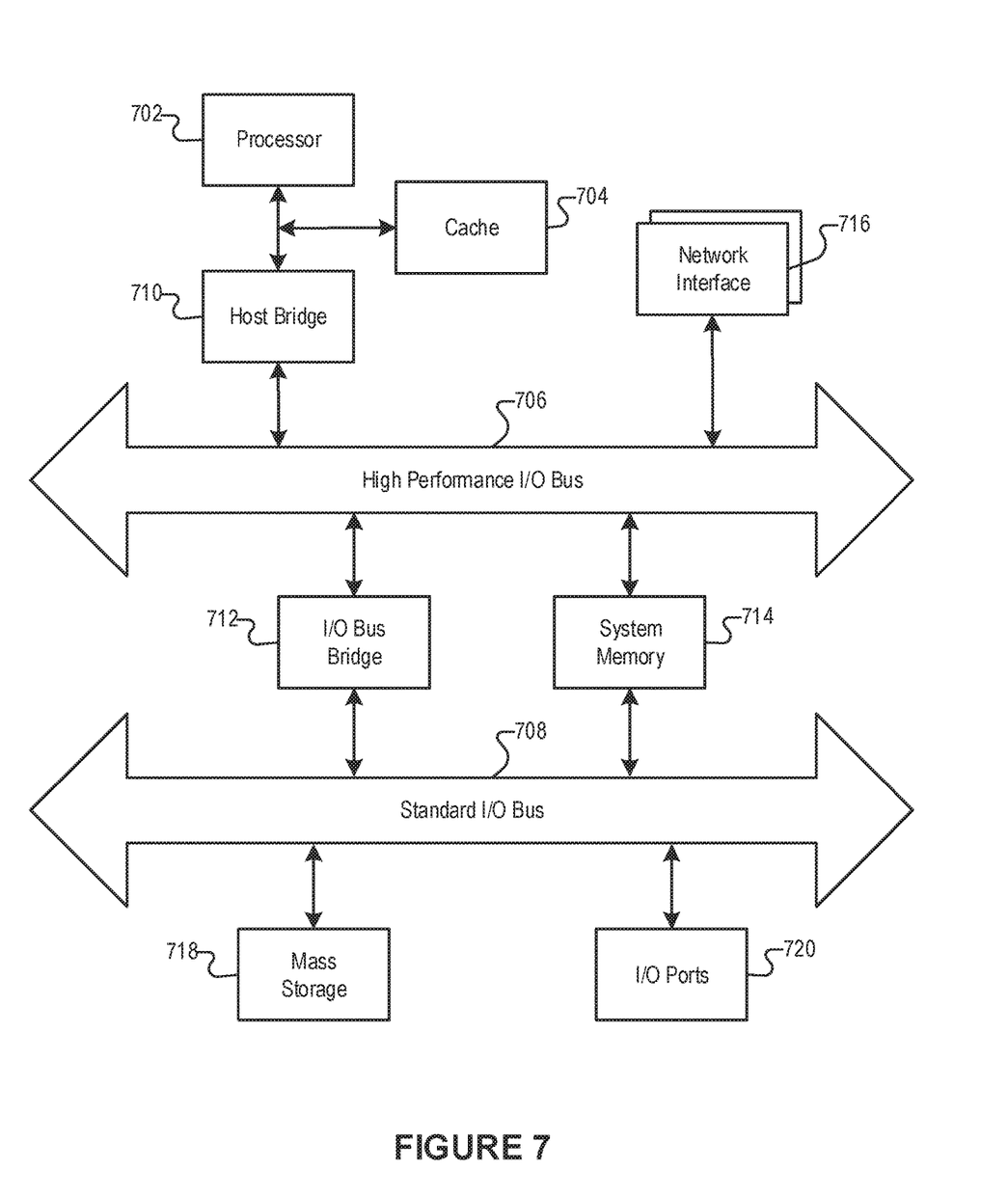
FIG. 7 illustrates an example of a computer system or computing device that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   determining, by a computing system, at least one event generated by a content player while accessing a content item;
   providing, by the computing system, event information describing the at least one event to a finite-state machine being used to manage events generated by the content player, wherein the finite-state machine is in a first state;
   transitioning, by the computing system, the finite-state machine from the first state to a second state in response to provision of the event information;
   causing, by the computing system, one or more actions associated with the second state to be performed based at least in part on transitioning the finite-state machine to the second state;
   providing, by the computing system, second event information describing a second event generated by the content player to the finite-state machine, wherein the second event information causes the finite-state machine to remain in the second state; and
   preventing, by the computing system, the one or more actions associated with the second state to be performed based on the finite-state machine remaining in the second state.

2. The computer-implemented method of claim 1, wherein the one or more actions cause the event information describing the at least one event to be logged.

3. The computer-implemented method of claim 2, wherein the event information describes the content item being accessed, a timestamp indicating when the content item was accessed, and the at least one event that was generated.

4. The computer-implemented method of claim 2, wherein the logged event information is used to determine one or more view metrics for the content item.

5. The computer-implemented method of claim 1, wherein the first state corresponds to a play state, a paused state, an unpaused state, or an exit state.

6. The computer-implemented method of claim 1, wherein the at least one event is generated in response to one or more actions performed by a user interacting with the content player.

7. The computer-implemented method of claim 1, wherein the first state is associated with one or more conditions that are satisfied upon provision of the event information, and wherein satisfaction of the one or more conditions causes the finite-state machine to be transitioned to the second state.

8. The computer-implemented method of claim 1, further comprising:
   determining, by the computing system, a different event generated by the content player while accessing the content item;
   providing, by the computing system, event information describing the different event to the finite-state machine;
   transitioning, by the computing system, the finite-state machine from the second state to a third state in response to provision of the event information describing the different event; and
   causing, by the computing system, one or more actions associated with the third state to be performed based at least in part on transitioning the finite-state machine to the third state.

9. The computer-implemented method of claim 8, wherein the one or more actions associated with the third state cause the event information describing the different event to be logged.

10. The computer-implemented method of claim 1, wherein the event describes a playback status of the content item.

11. A system comprising:
    at least one processor; and
    a memory storing instructions that, when executed by the at least one processor, cause the system to perform:
       determining at least one event generated by a content player while accessing a content item;
       providing event information describing the at least one event to a finite-state machine being used to manage events generated by the content player, wherein the finite-state machine is in a first state;
       transitioning the finite-state machine from the first state to a second state in response to provision of the event information;
       causing one or more actions associated with the second state to be performed based at least in part on transitioning the finite-state machine to the second state
       providing second event information describing a second event generated by the content player to the finite-state machine, wherein the second event information causes the finite-state machine to remain in the second state; and
       preventing the one or more actions associated with the second state to be performed based on the finite-state machine remaining in the second state.

12. The system of claim 11, wherein the one or more actions cause the event information describing the at least one event to be logged.

13. The system of claim 12, wherein the event information describes the content item being accessed, a timestamp indicating when the content item was accessed, and the at least one event that was generated.

14. The system of claim 12, wherein the logged event information is used to determine one or more view metrics for the content item.

15. The system of claim 11, wherein the first state corresponds to a play state, a paused state, an unpaused state, or an exit state.

16. A non-transitory computer-readable storage medium including instructions that, when executed by at least one processor of a computing system, cause the computing system to perform a method comprising:
    determining at least one event generated by a content player while accessing a content item;
    providing event information describing the at least one event to a finite-state machine being used to manage events generated by the content player, wherein the finite-state machine is in a first state;

transitioning the finite-state machine from the first state to a second state in response to provision of the event information;

causing one or more actions associated with the second state to be performed based at least in part on transitioning the finite-state machine to the second state;

providing second event information describing a second event generated by the content player to the finite-state machine, wherein the second event information causes the finite-state machine to remain in the second state; and preventing the one or more actions associated with the second state to be performed based on the finite-state machine remaining in the second state.

17. The non-transitory computer-readable storage medium of claim 16, wherein the one or more actions cause the event information describing the at least one event to be logged.

18. The non-transitory computer-readable storage medium of claim 17, wherein the event information describes the content item being accessed, a timestamp indicating when the content item was accessed, and the at least one event that was generated.

19. The non-transitory computer-readable storage medium of claim 17, wherein the logged event information is used to determine one or more view metrics for the content item.

20. The non-transitory computer-readable storage medium of claim 16, wherein the first state corresponds to a play state, a paused state, an unpaused state, or an exit state.

* * * * *